US012700918B2

(12) United States Patent
Lin

(10) Patent No.: US 12,700,918 B2
(45) Date of Patent: Aug. 4, 2026

(54) TIME OFFSET MEASUREMENT METHOD, USER DEVICE, SATELLITE CHANNEL EMULATOR AND BASE STATION

(71) Applicant: Industrial Technology Research Institute, Hsinchu (TW)

(72) Inventor: You-En Lin, Taichung City (TW)

(73) Assignee: Industrial Technology Research Institute, Hsinchu (TW)

( * ) Notice: Subject to any disclaimer, the term of this patent is extended or adjusted under 35 U.S.C. 154(b) by 296 days.

(21) Appl. No.: 18/421,998

(22) Filed: Jan. 25, 2024

(65) Prior Publication Data

US 2025/0141540 A1 May 1, 2025

(30) Foreign Application Priority Data

Oct. 27, 2023 (TW) ................................. 112141300

(51) Int. Cl.
*H04B 7/185* (2006.01)
*H04W 84/06* (2009.01)

(52) U.S. Cl.
CPC ..... *H04B 7/18539* (2013.01); *H04B 7/18547* (2013.01); *H04W 84/06* (2013.01)

(58) Field of Classification Search
CPC ............ H04B 7/18539; H04B 7/18547; H04B 7/18521; H04B 7/18513; H04B 7/18519;
(Continued)

(56) References Cited

U.S. PATENT DOCUMENTS

| | | | | |
|---|---|---|---|---|
| 8,675,635 | B2 * | 3/2014 | Agarwal | ............ H04B 7/18513 |
| | | | | 370/350 |
| 2021/0314889 | A1 | 10/2021 | Rico Alvarino et al. | |
| 2022/0291394 | A1 * | 9/2022 | Lee | ....................... H04W 48/12 |

FOREIGN PATENT DOCUMENTS

| | | |
|---|---|---|
| CN | 109154668 | 1/2019 |
| CN | 113271167 | 8/2021 |

(Continued)

OTHER PUBLICATIONS

Wenjia Liu et al., "Uplink Time Synchronization Method and Procedure in Release-17 NR NTN", 2022 IEEE 95th Vehicular Technology Conference (VTC2022-Spring), Jun. 19-22, 2022, pp. 1-5.

(Continued)

*Primary Examiner* — Temica M Beamer
(74) *Attorney, Agent, or Firm* — JCIPRNET

(57) ABSTRACT

A time offset measurement method suitable for Non-Terrestrial Network includes: listening to the first downlink signal and the second downlink signal through the user device to obtain the first reception time and the second reception time; using the known interval time as the unit time length to calculate multiple satellite distance difference values corresponding to multiple unit time lengths through a satellite distance function, obtaining multiple satellite movement time variations through dividing multiple satellite distance difference values by the electromagnetic wave propagation speed, generating a satellite movement function based on each sampling time and each of the satellite movement time variations corresponding to each sampling time; setting the reception time difference to calculate the corresponding sampling time through the satellite movement function as the downlink signal reception time; and obtaining the current distance between the user device and the satellite at the second reception time according to the ephemeris data.

18 Claims, 13 Drawing Sheets

(58) Field of Classification Search
   CPC ............. H04W 84/06; H04W 56/0015; H04W
                              56/004; H04W 56/001
   USPC ........................................................ 370/316
   See application file for complete search history.

(56)                    References Cited

FOREIGN PATENT DOCUMENTS

| | | | | |
|---|---|---|---|---|
| CN | 114900882 | 8/2022 | | |
| CN | 115136513 | 9/2022 | | |
| TW | I738234 | 9/2021 | | |
| TW | 202231083 | 8/2022 | | |
| TW | 202231091 | 8/2022 | | |
| TW | 202232994 | 8/2022 | | |
| TW | 202234938 | 9/2022 | | |
| TW | 202245543 | 11/2022 | | |
| TW | 202315444 | 4/2023 | | |
| WO | 2022236628 | 11/2022 | | |
| WO | WO-2023147850 A1 * | 8/2023 | .......... | H04W 64/006 |

OTHER PUBLICATIONS

Gilsoo Lee et al., "Uplink Synchronization for Internet of Things over Non-Terrestrial Network", 2022 IEEE 95th Vehicular Technology Conference (VTC2022-Spring), Jun. 19-22, 2022, pp. 1-6.

Jianwei Zhou et al., "Estimation and compensation of timing drift for NR-based NTN system", Advances in Communications Satellite Systems. Proceedings of the 37th International Communications Satellite Systems Conference (ICSSC-2019), Oct. 29-Nov. 1, 2019, pp. 1-12.

Yinan Qi et al., "On the Standardization of Key Enabling Technologies in Non-Terrestrial Network Air-interface Design", 2021 IEEE/CIC International Conference on Communications in China (ICCC Workshops), Jul. 28-30, 2021, pp. 343-348.

Qasim Sultan et al., "Downlink Synchronization in New Radio (NR) Non-Terrestrial Networks (NTN)", 2022 13th International Conference on Information and Communication Technology Convergence (ICTC), Oct. 19-21, 2022, pp. 1351-1353.

Yun Liu et al., "The Time-Frequency Synchronization for 5G NR Based Non-Terrestrial Networks", 2021 IEEE 21st International Conference on Communication Technology, Oct. 13-16, 2021, pp. 587-591.

"Office Action of Taiwan Counterpart Application", issued on May 28, 2024, p. 1-p. 26.

* cited by examiner

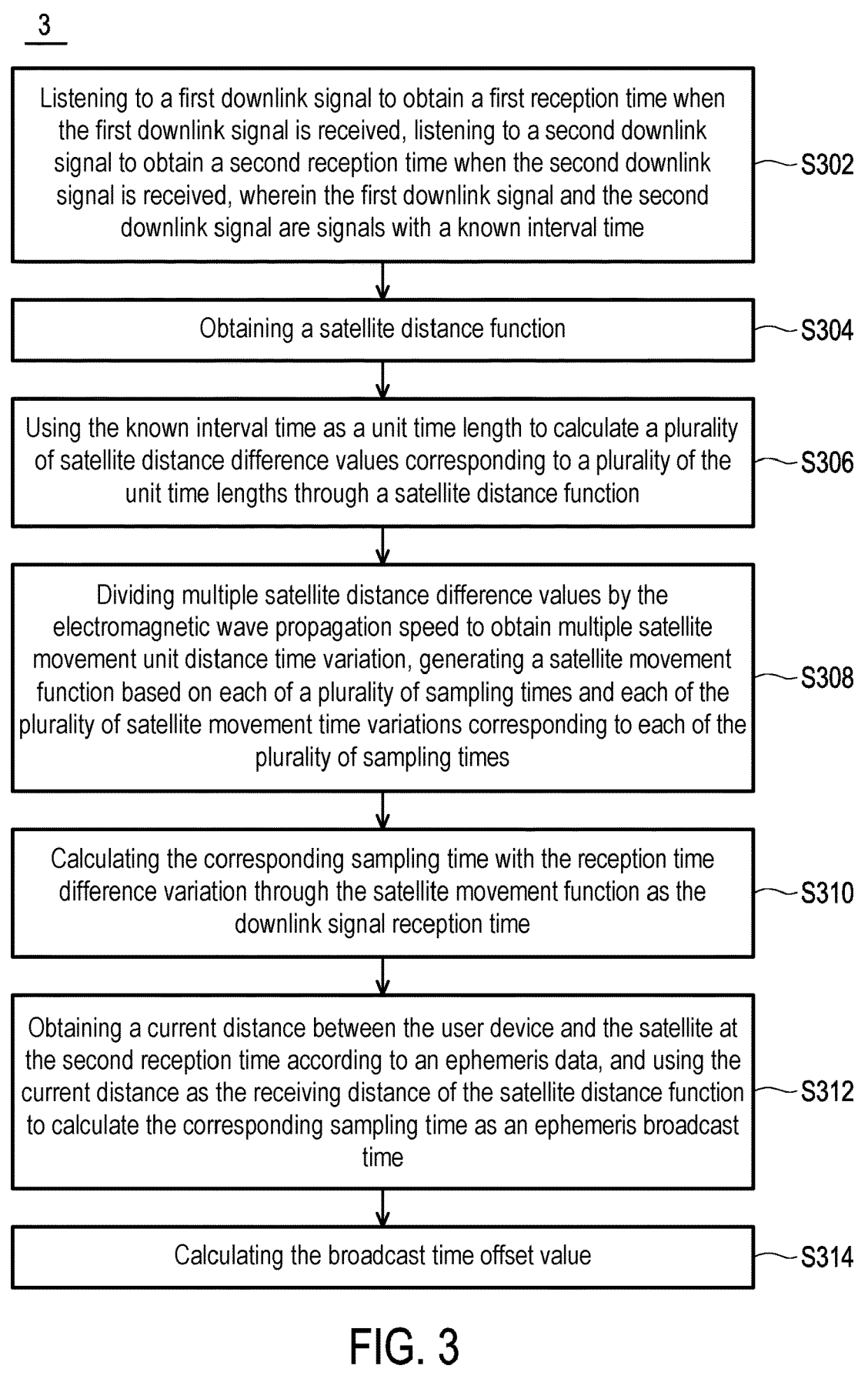

3

Listening to a first downlink signal to obtain a first reception time when the first downlink signal is received, listening to a second downlink signal to obtain a second reception time when the second downlink signal is received, wherein the first downlink signal and the second downlink signal are signals with a known interval time ⎯ S302

Obtaining a satellite distance function ⎯ S304

Using the known interval time as a unit time length to calculate a plurality of satellite distance difference values corresponding to a plurality of the unit time lengths through a satellite distance function ⎯ S306

Dividing multiple satellite distance difference values by the electromagnetic wave propagation speed to obtain multiple satellite movement unit distance time variation, generating a satellite movement function based on each of a plurality of sampling times and each of the plurality of satellite movement time variations corresponding to each of the plurality of sampling times ⎯ S308

Calculating the corresponding sampling time with the reception time difference variation through the satellite movement function as the downlink signal reception time ⎯ S310

Obtaining a current distance between the user device and the satellite at the second reception time according to an ephemeris data, and using the current distance as the receiving distance of the satellite distance function to calculate the corresponding sampling time as an ephemeris broadcast time ⎯ S312

Calculating the broadcast time offset value ⎯ S314

FIG. 3

TIME OFFSET MEASUREMENT METHOD, USER DEVICE, SATELLITE CHANNEL EMULATOR AND BASE STATION

CROSS-REFERENCE TO RELATED APPLICATION

This application claims the priority benefit of Taiwan application serial no. 112141300, filed on Oct. 27, 2023. The entirety of the above-mentioned patent application is hereby incorporated by reference herein and made a part of this specification.

TECHNICAL FIELD

The present disclosure relates to a measurement method, and in particular to a broadcast time offset measurement method of ephemeris data, a user device, a satellite channel emulator and a base station (BS).

BACKGROUND

For the past few years, as international satellite operators have invested a lot of money and related costs have become lower, which creates new opportunities for the space industry, the non-terrestrial network (NTN) is the mainstream for the development of current network service. NTN employs satellites or high-altitude platforms to provide safe, reliable and high-bandwidth connections to remote areas without terrestrial network coverage. The key to successfully establish NTN lies in that terminal devices can practically support 5G NR (New Radio) and Internet of Things (IoT) standards, so that it is possible to facilitate the provision of ubiquitous mobile connections for businesses and individuals in suburban areas.

However, since the low earth orbit (LEO) satellite flies along a fixed orbit at a speed of 7.7 kilometers/second, plus the frequency offset caused by network propagation delay and Doppler effect, the ephemeris data transmitted by the satellite control center to the next generation node B (gNB) might be out of sync with the actual position and status of the satellite. The ephemeris estimation result received by the user's device might be different from the current satellite channel status, which results in propagation errors.

The propagation error might result from improper time synchronization and event triggering between NTN network components, or that the transmission time of the transmission network between NTN network components is variable, or that the signal processing time of the various NTN network components themselves is variable. Therefore, how to measure the offset value of NTN transmission to compensate and correct some NTN network components is an issue that needs to be solved.

SUMMARY

The present disclosure provides a time offset measurement method suitable for non-terrestrial network (NTN), which includes: listening to the first downlink signal and the second downlink signal respectively through the user device to obtain the first reception time and the second reception time, wherein the first downlink signal and the second downlink signal are signals with a known interval time, wherein the second reception time minus the first reception time and the known interval time is the reception time difference variation; using the known interval time as the unit time length to calculate multiple satellite distance difference values corresponding to multiple unit time lengths through a satellite distance function, obtaining multiple satellite movement time variations through dividing multiple satellite distance difference values by the electromagnetic wave propagation speed, generating a satellite movement function based on each sampling time and each of the satellite movement time variations corresponding to each sampling time; using the reception time difference variation to calculate the corresponding sampling time through the satellite movement function as the downlink signal reception time; obtaining the current distance between the user device and the satellite at the second reception time according to the ephemeris data, and using the current distance as the receiving distance of the satellite distance function to calculate the corresponding sampling time as the ephemeris broadcast time; and calculating the broadcast time offset value, wherein the broadcast time offset value is the downlink signal reception time plus the known interval time minus the ephemeris broadcast time.

The present disclosure further provides a user device, including a memory, a network interface and a processor. The network interface is connected to the non-terrestrial network and the satellite channel emulator for listening to the first downlink signal and the second downlink signal and receiving the broadcast time offset value. The processor is coupled to the memory and the network interface for: obtaining the first reception time when the network interface receives the first downlink signal, and obtaining the second reception time when the network interface receives the second downlink signal, wherein the first downlink signal and the second downlink signal are signals with a known interval time, wherein the second reception time minus the first reception time and the known interval time is the reception time difference variation; transmitting the first reception time, the second reception time and the reception time difference variation to the satellite channel emulator through the network interface; receiving the broadcast time offset value from the satellite channel emulator through the network interface; and calculating the satellite position according to the ephemeris data and determining the uplink timing advance or retard time based on the broadcast time offset value.

The present disclosure further provides a satellite channel emulator, including a memory, a network interface and a processor. The memory is disposed to store ephemeris data. The network interface connects the NTN next generation node B (gNB) and the user device, and is disposed to receive the first reception time, the second reception time and the reception time difference variation from the user device, and transmits the broadcast time offset value to the NTN gNB and the user device, wherein the user device listens to the first downlink signal to obtain the first reception time, which is the time when the first downlink signal is received, and the user device listens to the second downlink signal to obtain the second reception time, which is the time when the second downlink signal is received, wherein the first downlink signal and the second downlink signal are signals with a known interval time, wherein the reception time difference variation is the second reception time minus the first reception time and the known interval time. The processor is coupled to the memory and network interface for: using the known interval time as the unit time length to calculate multiple satellite distance difference values corresponding to multiple unit time lengths through a satellite distance function, obtaining multiple satellite movement time variations through dividing multiple satellite distance difference values by the electromagnetic wave propagation speed, generating a satellite movement function based on each sampling time and each of the satellite movement time variations corresponding to each sampling time; using the reception time difference variation to calculate the corresponding sampling time through the satellite movement function as the downlink signal reception time; obtaining the current distance between the user device and the satellite at the second reception time according to the ephemeris data, and using the current distance as the receiving distance of the satellite distance function to calculate the corresponding sampling time as the ephemeris broadcast time; and calculating the broadcast time offset value, wherein the broadcast time offset value is the downlink signal reception time plus the known interval time minus the ephemeris broadcast time.

The present disclosure further provides a next generation node B (gNB) suitable for non-terrestrial networks, including: a memory, a network interface and a processor. The network interface connects the user device and the satellite channel emulator, and is disposed to receive the broadcast time offset value and ephemeris data from the satellite channel emulator. The processor is coupled to the memory and the network interface to obtain the broadcast time offset value and ephemeris data, and adjusts the time stamp in the ephemeris data backwards to the broadcast time offset value to generate adjusted ephemeris data.

Based on the above, the broadcast time offset measurement method of ephemeris data, the user device, the satellite channel emulator and the gNB provided by the present disclosure may receive the two reception times of the two downlink signals by listening to the two downlink signals to determine whether the satellite is flying farther away from or closer to the user device, and generate a satellite distance function through the distance between the user device and the satellite, generate the satellite movement function through the satellite distance function, use the satellite distance function and satellite movement function to estimate the difference between the satellite position obtained from the ephemeris data broadcast by the satellite control center and the actual position of the satellite, and calculate the compensated offset value accordingly. The calculated offset value is used to compensate and correct some NTN network components. Therefore, the broadcast time offset measurement method of ephemeris data, the user device, the satellite channel emulator and the gNB provided by the present disclosure may enable the ephemeris data transmitted by the satellite control center to the gNB to overcome the network propagation retard and significantly reduce the frequency offset caused by the Doppler effect, so that the ephemeris estimation result received by the user device is able to be synchronized with the currently experienced satellite channel status.

BRIEF DESCRIPTION OF THE DRAWINGS

FIG. 3 is a flow chart of a time offset measurement method according to an embodiment of the present disclosure.

DETAILED DESCRIPTION OF DISCLOSED EMBODIMENTS

Figure 1:
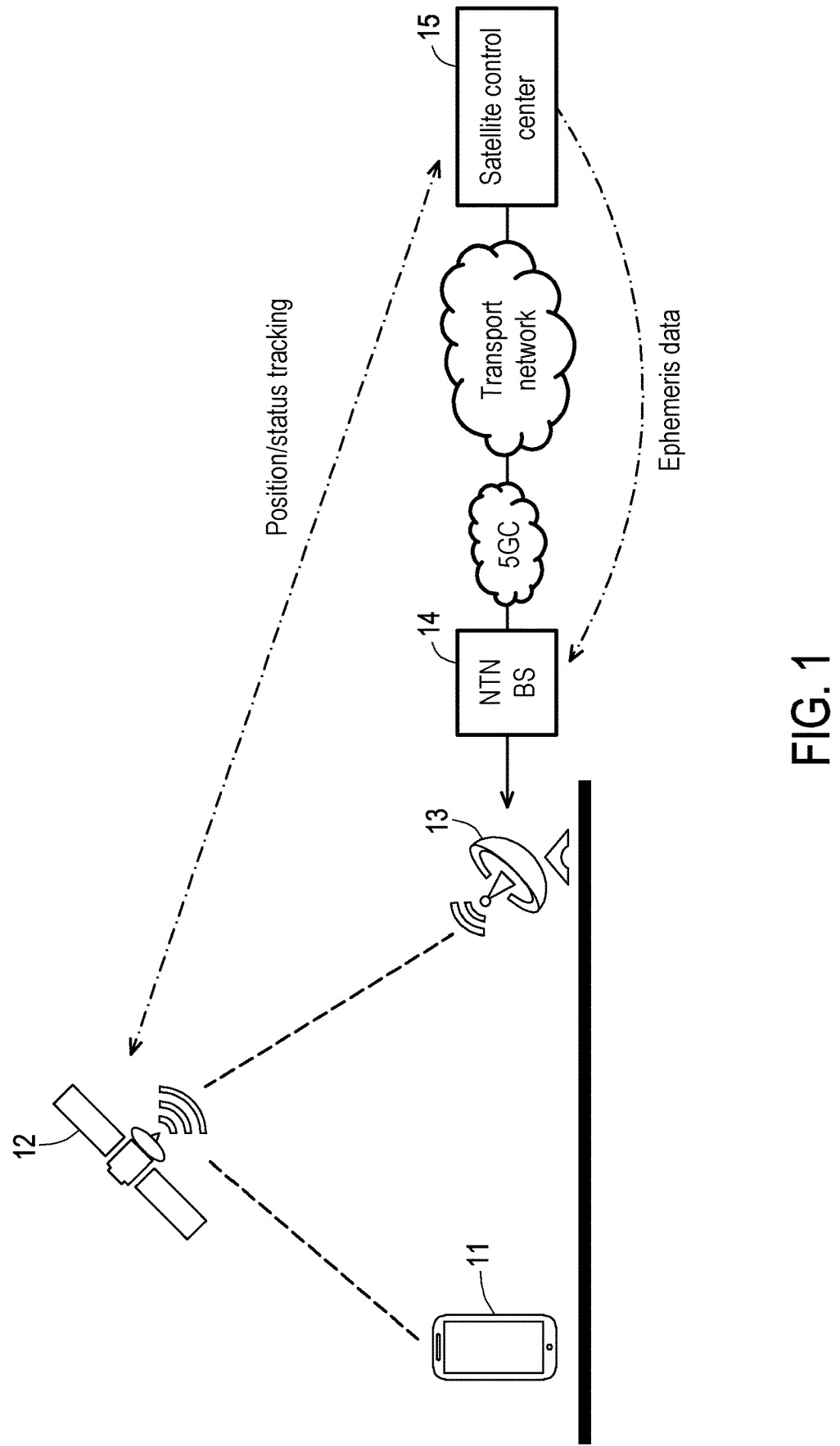
FIG. 1 is a schematic view of the current non-terrestrial network (NTN) communication.

FIG. 1 is a schematic view of the current non-terrestrial network (NTN) communication. Briefly, the user device 11 (for example, the NTN user device) communicates with the NTN gateway 13 through the LEO satellite 12. In some embodiments, the user device 11 may be or may be configured to operate as a User Equipment (UE). However, currently many network communication companies do not have their own satellites, but rely on cooperation with satellite companies to achieve non-terrestrial network communications. As shown in FIG. 1, the network communication company has an NTN base station (BS) 14. In some embodiments, the NTN base station (BS) 14 may be or may be configured to operate as NTN next generation node B (gNB). The NTN base station (BS) 14 is networked to the NTN gateway 13. The satellite operator has a satellite control center 15. The satellite control center 15 is connected to the satellite 12 to track the position and status of the satellite 12. The satellite control center 15 transmits the ephemeris data about the satellite 12 to the NTN base station (BS) 14 through the transport network, the 5G core network or next generation core network.

Since the satellite 12 flies along a fixed orbit at a high speed, plus the frequency offset caused by network propagation delay and Doppler effect, the ephemeris data transmitted by the satellite control center 15 to the NTN base station (BS) might be out of sync with the actual position and status of the satellite 12. Therefore, for a non-terrestrial network communication architecture shown in FIG. 1 or the non-terrestrial network emulating system that simulates the non-terrestrial network communication architecture shown in FIG. 1, the offset value of NTN transmission may be measured, the offset of NTN network components are compensated and corrected based on the offset value.

Figure 2:
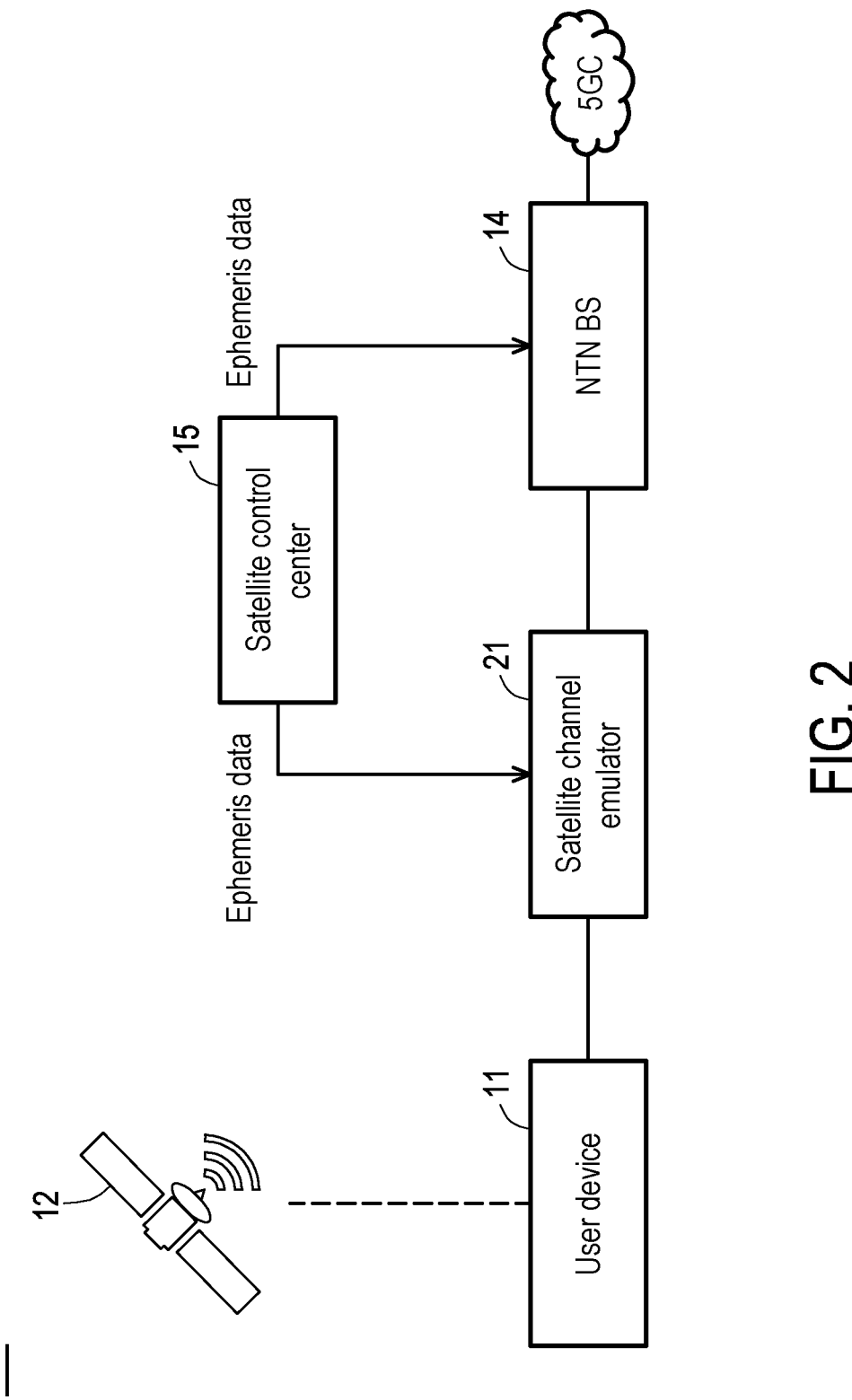
FIG. 2 is a schematic view of a non-terrestrial network emulating system according to an embodiment of the present disclosure.

FIG. 2 is a schematic view of a non-terrestrial network emulating system 2 according to an embodiment of the present disclosure. Referring to FIG. 2, the non-terrestrial network emulating system 2 includes a user device 11, an NTN base station (BS) 14, a satellite control center 15 and a satellite channel emulator 21.

The user device 11 may be a user device suitable for NTN (such as a mobile phone), or may be a user device emulator.

The satellite channel emulator 21 is disposed to emulate the service link between the user device 11 and the satellite 12 shown in FIG. 1 and the feeder link between the NTN gateway 13 and the satellite 12. The satellite control center 15 will transmit the ephemeris data to the NTN base station (BS) 14, and will also transmit the ephemeris data to the satellite channel emulator 21, so that the satellite channel emulator 21 is able to emulate the position and status of the satellite 12 shown in FIG. 1.

FIG. 3 is a flow chart of a time offset measurement method 3 according to an embodiment of the present disclosure. Reference of the process flow of the time offset measurement method 3 shown in FIG. 3 may be made to the non-terrestrial network emulating system 2 in FIG. 2. Specifically, the time offset measurement method 3 is applicable to the non-terrestrial networks (NTN). When the ephemeris data broadcast by the gNB is not synchronized with the actual position of the satellite, the non-terrestrial network emulating system 2 and the non-terrestrial network communication architecture shown in FIG. 1 may execute the time offset measurement method 3 to generate an ephemeris broadcast time offset value to compensate for the error caused by the propagation asynchrony.

Please refer to FIG. 2 and FIG. 3. The time offset measurement method 3 includes steps S302, S304, S306, S308, S310, S312 and S314.

In step S302, the user device 11 listens to the first downlink signal from the satellite 12 to obtain the first reception time when the first downlink signal is received, and listens to the second downlink signal from the satellite 12 to obtain the second reception time when the second downlink signal is received, wherein the first downlink signal and the second downlink signal are signals with a known interval time P, wherein the second reception time minus the first reception time and the known interval time P is the reception time difference variation $t_{delta}$ (not shown in the figure).

Figure 4:
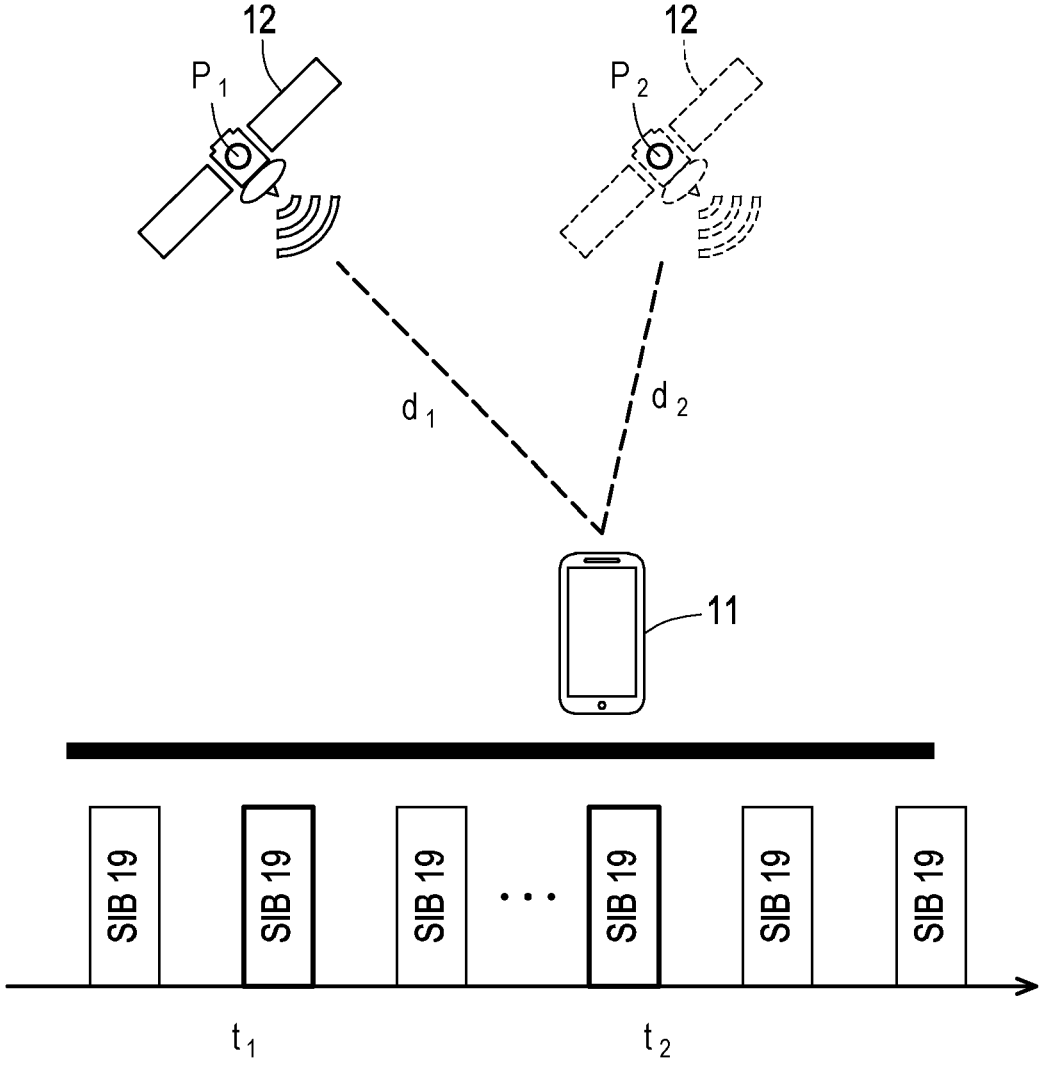
FIG. 4 is a schematic view of obtaining the first reception time and the second reception time according to step S302 of FIG. 3.

FIG. 4 is a schematic view of obtaining the first reception time $t_1$ and the second reception time $t_2$ according to step S302 of FIG. 3. First, when the satellite 12 is at the position $P_1$, the distance between the satellite 12 and the user device 11 is the distance $d_1$. The user device 11 listens to the first downlink signal from the satellite 12 to obtain the first reception time $t_1$ when the first downlink signal is received. Since the satellite 12 continues to fly along the satellite orbit, when the satellite 12 is at the position $P_2$, the distance between the satellite 12 and the user device 11 is the distance $d_2$. The user device 11 listens to the second downlink signal from the satellite 12 to obtain the second reception time $t_2$ when the second downlink signal is received.

In particular, when the reception time difference variation $t_{delta}$ is a positive value, it means that the second reception time $t_2$ is greater than (the first reception time $t_1$+the known interval time P), and it can be determined that the satellite 12 is moving farther away from the user device 11. On the contrary, when the reception time difference variation $t_{delta}$ is a negative value, it means that the second reception time $t_2$ is less than (the first reception time $t_1$+the known interval time P), and it can be determined that the satellite 12 is flying closer to the user device 11.

The user device 11 may freely select a signal with a known interval P to listen to. The known interval P may be the NR system time, such as SFN/Slot/Symbol/Sample, and the signal may be, for example, Primary Synchronization Signal (PSS), Secondary Synchronization Signal (SSS), Synchronization Signal Blocks (SSB), System Information Blocks 1 (SIB1), SIB2, SIB19, Channel State Information Reference Signal (CSI-RS) and other signals. The first downlink signal and the second downlink signal listened to by the user device 11 may be the same or different.

Please further refer to FIG. 2 and FIG. 3. In step S304, the satellite distance function F(t) is obtained, wherein the satellite distance function F(t) is a function of multiple sampling times corresponding to multiple receiving distances between the user device and the satellite.

Figure 5A:
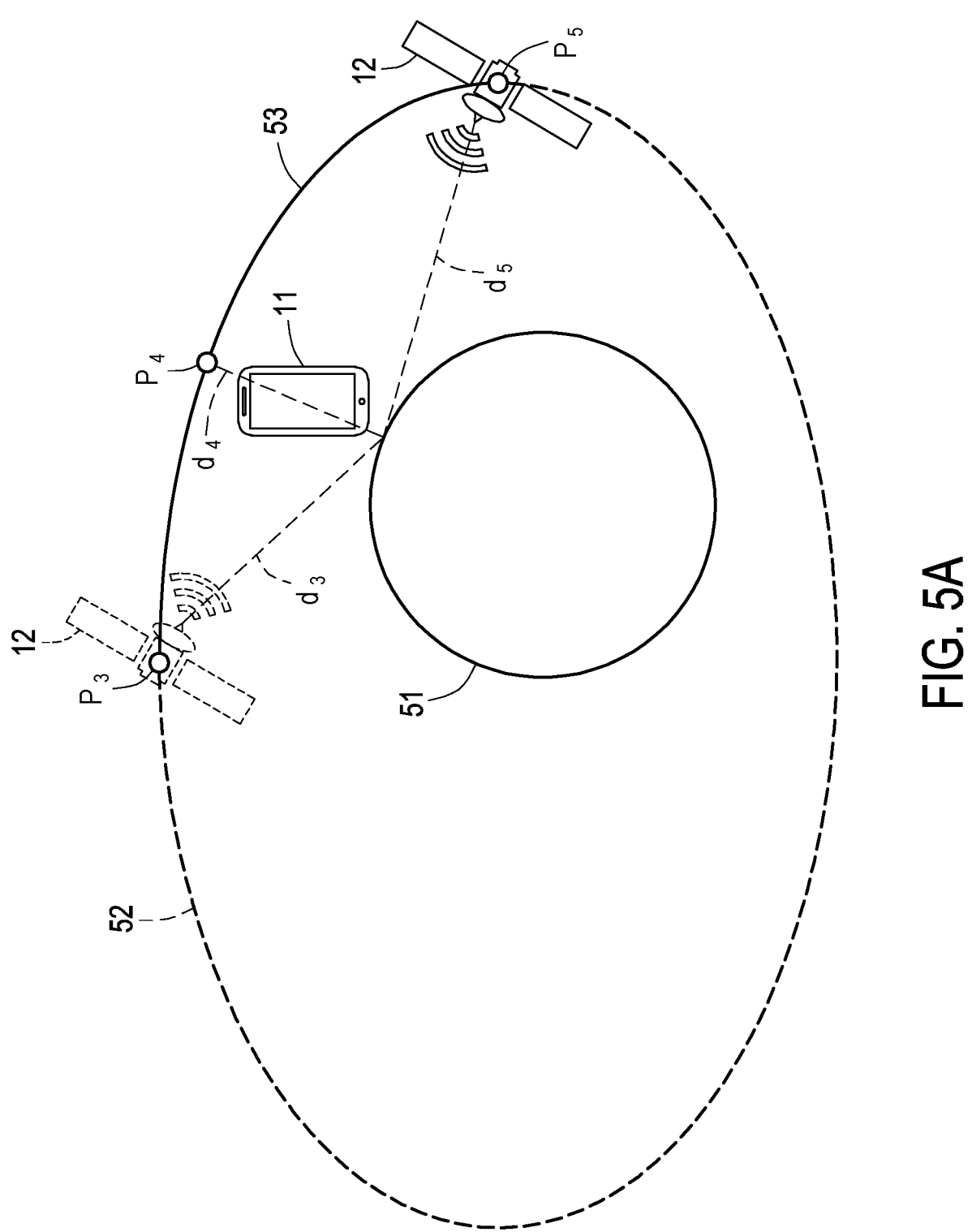
FIG. 5A is a schematic view of calculating multiple receiving distances between the user device and the satellite at multiple sampling times according to step S304 of FIG. 3.

FIG. 5A is a schematic view of calculating multiple receiving distances between the user device 11 and the satellite 12 at multiple sampling times according to step S304 of FIG. 3. In an embodiment, the trajectory of the satellite 12 orbiting the earth 51 is along the known satellite orbit 52. Since the satellite 12 flies very fast, relatively speaking, the user device 11 will be located at a similar location on the earth 51 in a short period of time. As the relative positions of the satellite 12 and the earth 51 change, the user device 11 will have a limit in receiving the downlink signal of the same satellite 12.

As shown in FIG. 5A, in the path 53 along which the satellite 12 flies from the position $P_3$ through the position $P_4$ to the position $P_5$, the user device 11 may receive the downlink signal of the satellite 12. However, when the satellite 12 is at a position other than the path 53, the user device 11 is not able to receive the downlink signal of the satellite 12. Therefore, it may be determined that the total time length during which the user device 11 is able to receive the first downlink signal and the second downlink signal from the satellite 12 is the total time length (for example, 3 minutes) during which the satellite 12 flies along the path 53 from the position $P_3$ through the position $P_4$ to the position $P_5$. Multiple sampling times within the total time length are obtained from multiple satellite coordinates of the satellite 12 on the known satellite orbit 52, wherein the satellite orbit 52 may be obtained through other channels (such as pre-downloaded from the Internet). Then, the receiving distance between the user device 11 and the satellite 12 at each sampling time is calculated according to each satellite coordinate to generate a satellite distance function F(t).

If the user device 11 is not able obtain the satellite orbit 52, the ephemeris data provided by the satellite control center 15 is used to obtain the satellite coordinate to obtain the distance between the user device 11 and the satellite 12 to generate the satellite distance function F(t). In an embodiment, multiple satellite coordinates of the satellite 12 are obtained at multiple sampling times within the total time length based on the time stamp and satellite position data in the ephemeris data. Then, the receiving distance between the user device 11 and the satellite 12 at each sampling time is calculated according to each satellite coordinate to generate the satellite distance function F(t). Further explanation is provided below through illustration of FIG. 5B.

Figure 5B:
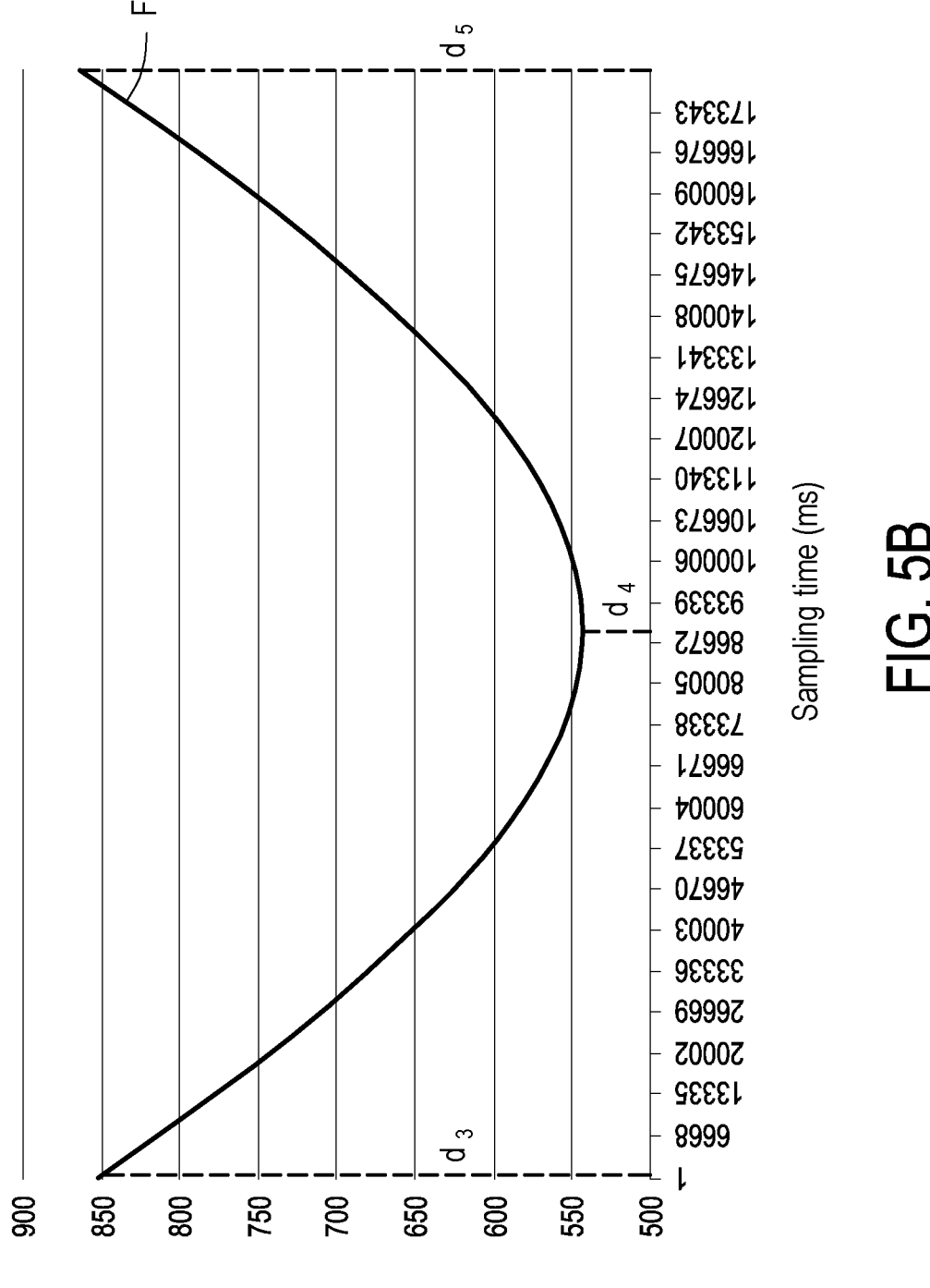
FIG. 5B is a graph showing sampling time and receiving distance of a non-terrestrial network emulating system according to an embodiment of the present disclosure.

FIG. 5B is a graph showing sampling time and receiving distance of a non-terrestrial network emulating system 2 according to an embodiment of the present disclosure. Please refer to FIG. 5A and FIG. 5B. Since the user device 11 is able to receive the downlink signal of the satellite 12 only from the path 53 along which the satellite 12 flies from the position $P_3$ through the position $P_4$ to the position $P_5$, the distance between the user device 11 and the satellite 12 is calculated starting from when the satellite 12 is at the position $P_3$. In the process where the satellite 12 flies along the path 53 from the position $P_3$ through the position $P_4$ to the position $P_5$, the distance between the user device 11 and the satellite 12 is calculated sequentially at multiple sampling times until the satellite 12 is at the position $P_5$.

When the satellite 12 is at the position $P_3$, the distance between the satellite 12 and the user device 11 is the distance $d_3$. When the satellite 12 is at the position $P_4$, the distance between the satellite 12 and the user device 11 is the distance $d_4$. When the satellite 12 is at the position $P_5$, the distance between the satellite 12 and the user device 11 is the distance $d_5$. It can be seen from FIG. 5A that when the satellite 12 is at the position $P_3$ or the position $P_5$, the distance between the satellite 12 and the user device 11 is the maximum value, that is, the satellite 12 is located at the address furthest from the earth 51; when the satellite 12 is at the position $P_4$, the distance between the satellite 12 and the user device 11 is the minimum value, that is, the satellite 12 is located at the position closest to the earth 51. In other words, in the path 53 along which the satellite 12 flies from the position $P_3$ to the position $P_4$, the distance between the satellite 12 and the user device 11 will gradually become smaller, and then gradually become larger, so the graph of the sampling time and the receiving distance will show a curve with a recess facing upward, and the curve with the recess facing upward is the satellite distance function F(t).

Figure 6A:
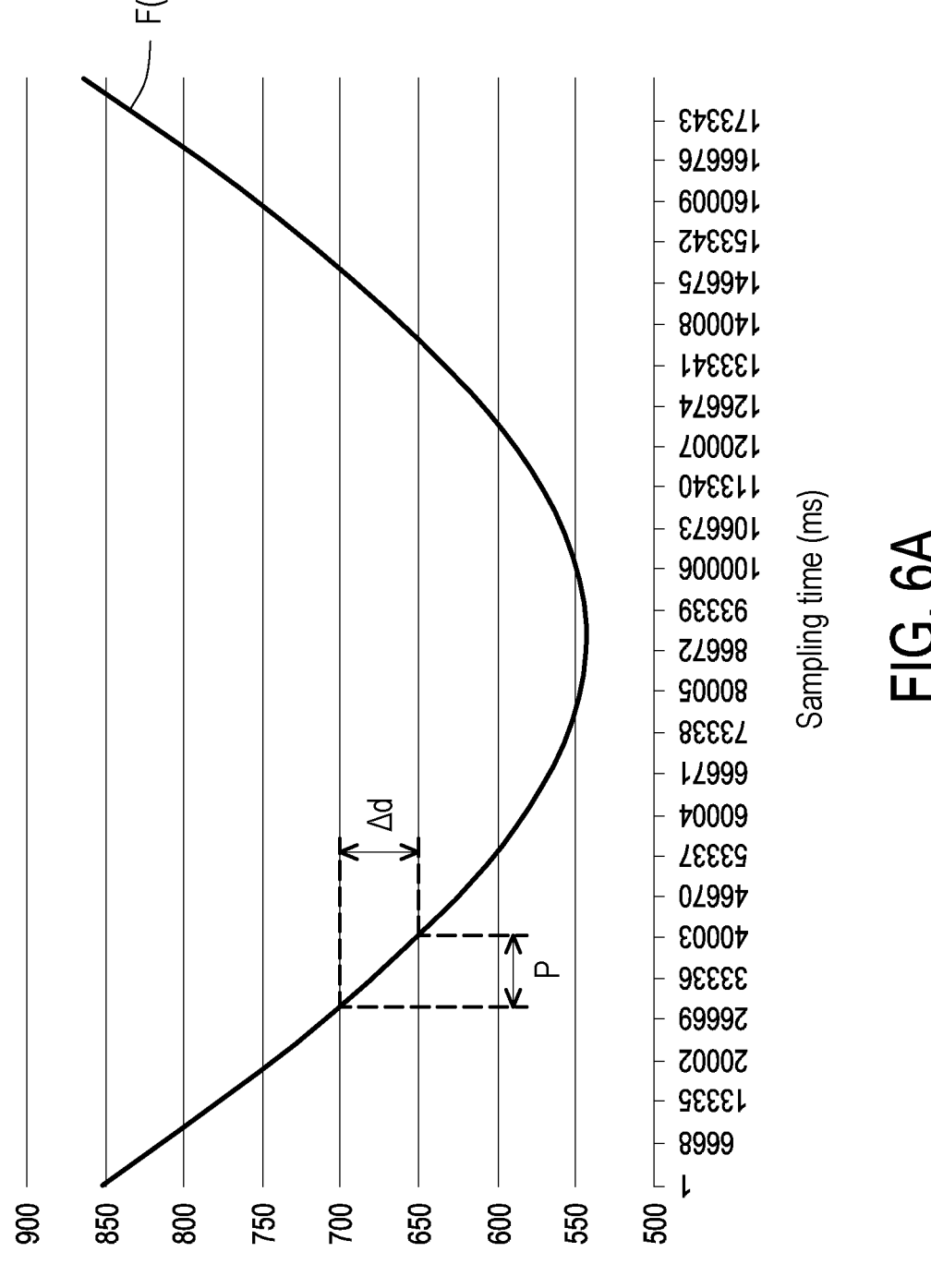
FIG. 6A and FIG. 6B are schematic views of a satellite distance function in a non-terrestrial network emulating system converted into a satellite movement function according to an embodiment of the present disclosure.
Figure 6B:
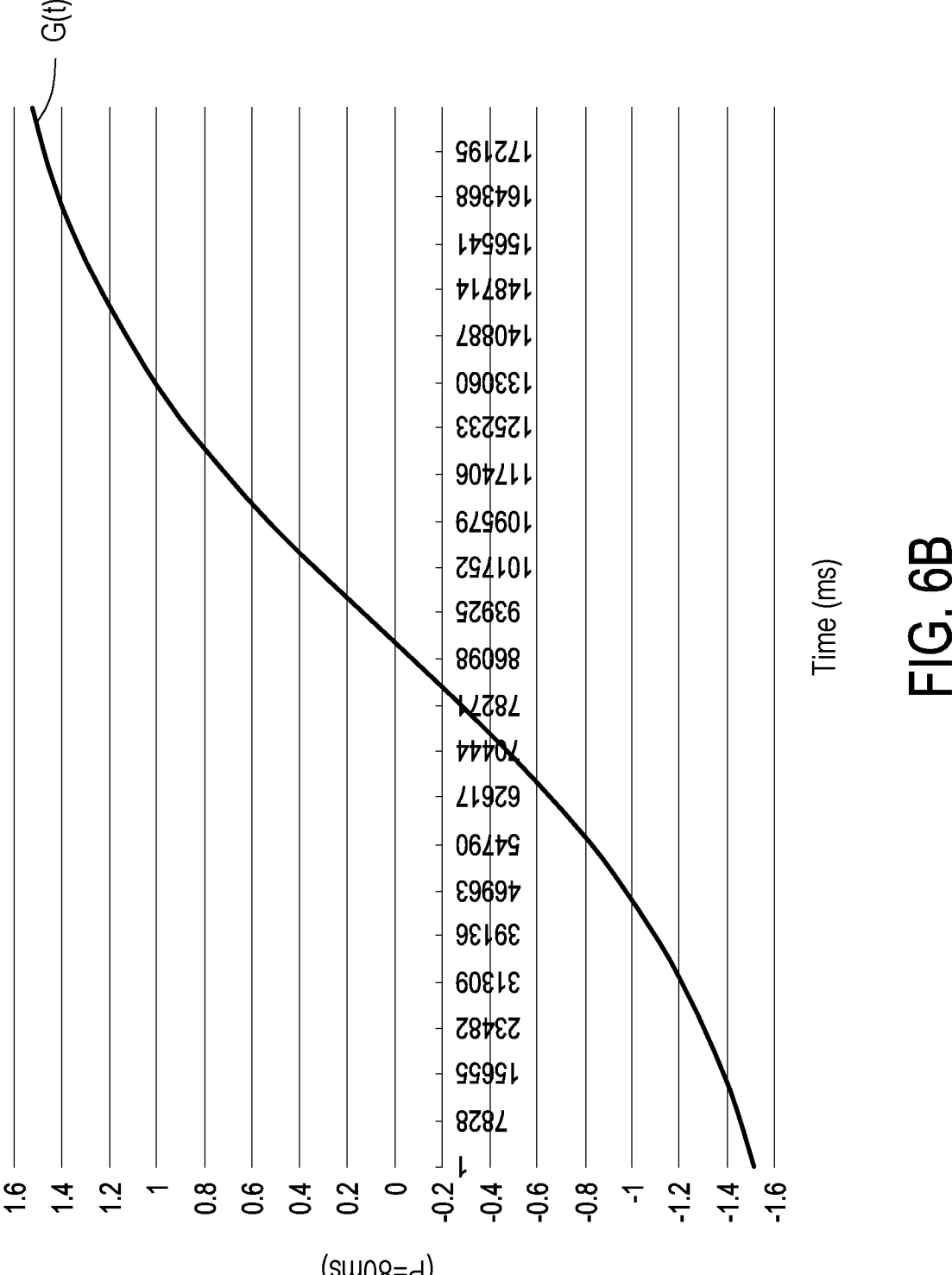

Next, the satellite distance function F(t) is converted into the satellite movement function G(t). FIG. 6A and FIG. 6B are schematic views of a satellite distance function F(t) in a non-terrestrial network emulating system 2 converted into a satellite movement function G(t) according to an embodiment of the present disclosure. Please refer to FIG. 2, FIG. 3, FIG. 6A and FIG. 6B. As mentioned above, the user device 11 may freely select a signal with a known interval time P to listen to, and the known interval time P (for example, the interval time of SIB19 is 80 ms) may be expressed as a unit time length. In step S306, multiple satellite distance difference values Ad corresponding to multiple unit time lengths are calculated through the satellite distance function F(t). In step S308, multiple satellite distance difference values Ad are divided by the electromagnetic wave propagation speed v to obtain multiple satellite movement unit distance time variation Ad/v, and the satellite movement function G(t) is generated based on each sampling time and each satellite movement time variation Ad/v corresponding to each sampling time.

Next, in step S310, the corresponding sampling time is calculated with the reception time difference variation $t_{delta}$ through the satellite movement function G(t) as the downlink signal reception time $t_3$. Briefly, the reception time difference variation $t_{delta}$, which is obtained through the second reception time $t_2$ minus the first reception time $t_1$ and the known interval time P, is reverse looked-up through the satellite movement function G(t) to obtain the downlink signal reception time $t_3$. The downlink signal reception time $t_3$ is the satellite position moment estimated from the downlink signal time difference variation.

Figure 7:
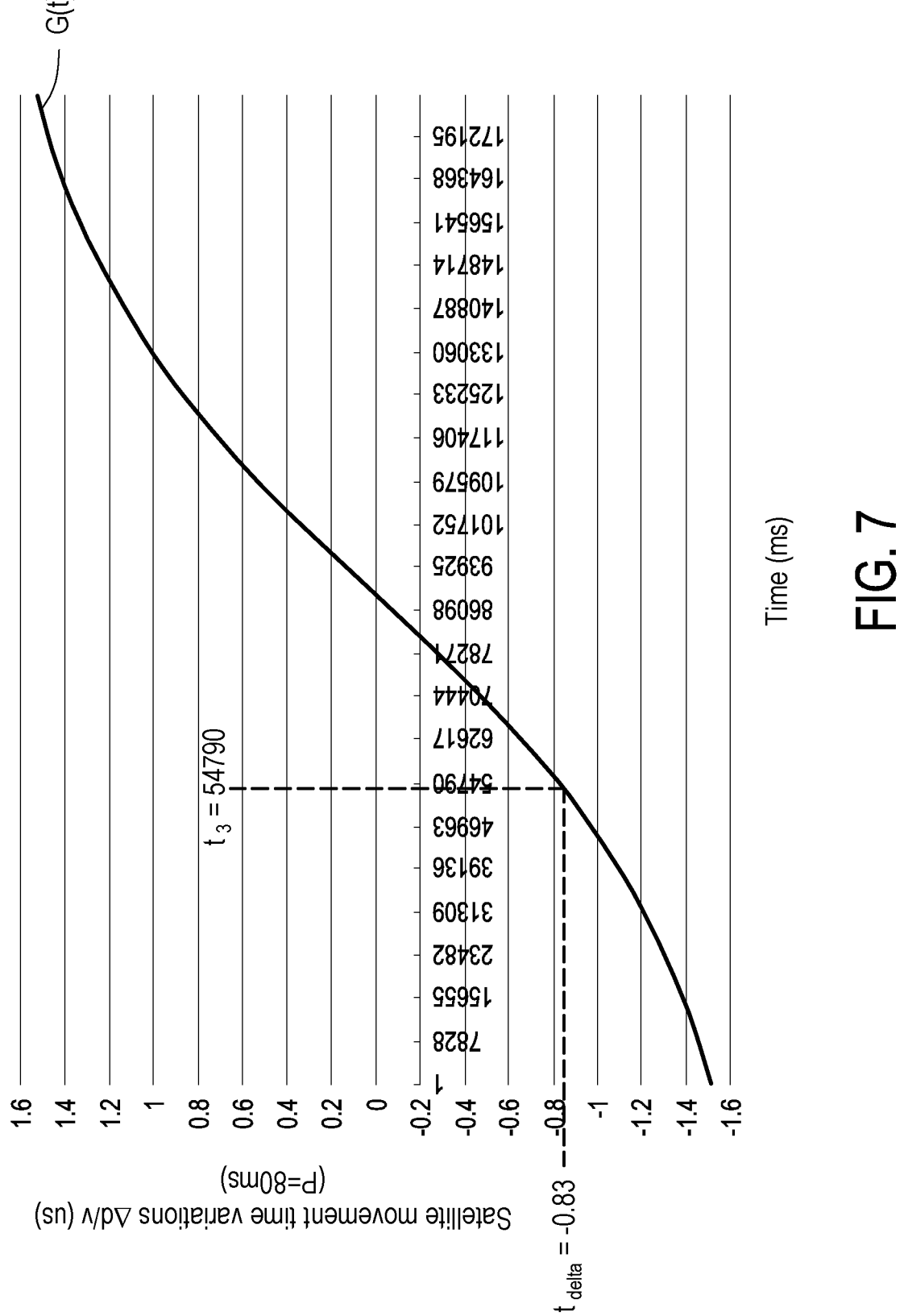
FIG. 7 is a schematic view illustrating the corresponding downlink signal reception time obtained through reverse lookup of the satellite movement function using the reception time difference variation as shown in step S310 of FIG. 3.

FIG. 7 is a schematic view illustrating the corresponding downlink signal reception time $t_3$ obtained through reverse lookup of the satellite movement function G(t) using the reception time difference variation $t_{delta}$ as shown in step S310 of FIG. 3. Please refer to FIG. 7. For example, the reception time difference variation $t_{delta}$, which is obtained through the second reception time $t_2$ minus the first reception time $t_1$ and the known interval time P, is −0.83 us, after taking −0.83 us into the satellite movement function G(t), it can be found through reverse lookup that the corresponding downlink signal reception time $t_3$ is 54790 ms.

In step S312, the position $P_2$ of the satellite 12 at the second reception time $t_2$ is obtained based on the ephemeris data received from the satellite control center 15, and the current distance $d_2$ between the user device 11 and the satellite 12 is estimated based on the position $P_2$ of the satellite 12. Next, the current distance $d_2$ is used as the receiving distance of the satellite distance function F(t) to calculate the corresponding sampling time as the ephemeris broadcast time $t_4$. The ephemeris broadcast time $t_4$ is the satellite position moment estimated from the ephemeris information broadcast by the gNB.

Figure 8:
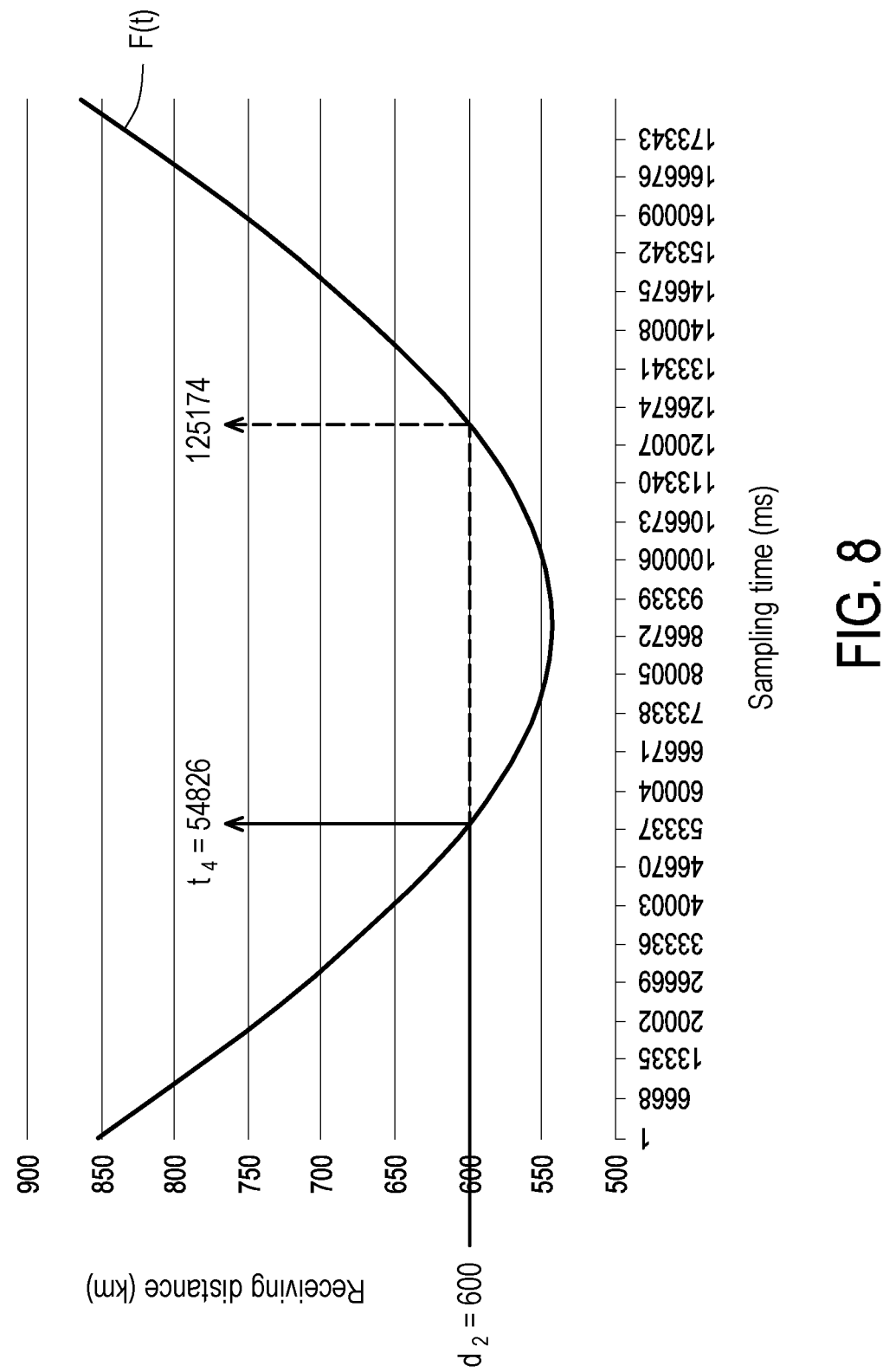
FIG. 8 is a schematic view of calculating the ephemeris broadcast time according to step S312 of FIG. 3.

FIG. 8 is a schematic view of calculating the ephemeris broadcast time $t_4$ according to step S312 of FIG. 3. Please refer to FIG. 8. For example, based on the position $P_2$ of the satellite 12, the current distance $d_2$ between the user device 11 and the satellite 12 is calculated to be 600 km. After taking 600 km into the satellite distance function F(t), the corresponding sampling time may be found through reverse lookup. It can be seen from FIG. 8 that when the current distance $d_2$ is 600 km, two sampling times will be obtained through reverse lookup of the satellite distance function F(t), for example: 54826 ms and 125174 ms.

Through the reception time difference variation $t_{delta}$, which may be a positive value or a negative value, it can be determined whether the satellite 12 is flying closer to the user device 11 or flying farther away from the user device 11. As shown in FIG. 5A, when the satellite 12 flies from the position $P_3$ to the position $P_4$, it means that the satellite 12 flies closer to the user device 11. When the satellite 12 flies from the position $P_4$ to the position $P_5$, it means that the satellite 12 flies farther away from the user device 11. Since the reception time difference variation $t_{delta}$ is −0.83 us, which is a negative value, it may be determined that the satellite 12 is flying closer to the user device 11.

Once it is determined that the satellite 12 is flying closer to the user device 11, it can be seen as shown in FIG. 8 that, when taking the current distance $d_2$ as 600 km into the satellite distance function F(t), among the two sampling times obtained through reverse lookup, 54826 ms should be selected as the ephemeris broadcast time $t_4$.

In step S314, the broadcast time offset value $t_{offset}$ is calculated. The broadcast time offset value $t_{offset}$ is the offset obtained by compensating for the difference between the satellite position obtained from the ephemeris data broadcast by the satellite control center 15 and the actual position of the satellite, wherein broadcast time offset value $t_{offset}$=downlink signal reception time $t_3$+known interval time P−ephemeris broadcast time $t_4$.

For example: the downlink signal reception time $t_3$ is 54790 ms, the known interval time P is 80 ms, and the ephemeris broadcast time $t_4$ is 54826 ms. Therefore, broadcast time offset value $t_{offset}$=54790+80−54826=44 (ms).

In addition to obtaining the broadcast time offset value $t_{offset}$ by executing steps S302 to S314 once, the average broadcast time offset value $t_{offset}$ may also be obtained by repeatedly executing steps S302 to S314.

After the broadcast time offset value $t_{offset}$ is calculated, the satellite control center 15, the satellite channel emulator 21, and the NTN base station (BS) 14 may all perform compensation and correction on some NTN network components based on the broadcast time offset value $t_{offset}$ to advance, defer, or retard the adjustment of transmission of the time stamp in the ephemeris and ephemeris data. Alternatively, the user device 11 may estimate the satellite position based on the ephemeris data, and determine the uplink signal timing advance or retard time based on the broadcast time offset value $t_{offset}$ to obtain more accurate uplink timing advance or retard value. Taking the calculated broadcast time offset value $t_{offset}$ as 44 ms as an example to illustrate the application of the broadcast time offset value $t_{offset}$. Please refer to FIG. 1 and FIG. 2. In an embodiment, the ephemeris data may be transmitted to the NTN base station (BS) 14 through the satellite control center 15 44 ms in advance. In another embodiment, the satellite control center 15 may retard sending the ephemeris data to the satellite channel emulator 21 by 44 ms. In another embodiment, the time stamp in the ephemeris data may be forwarded by 44 ms through NTN base station (BS) 14 to generate adjusted ephemeris data. In another embodiment, when the user device 11 is able to estimate the satellite position according to the broadcast ephemeris data, the uplink timing advance time is determined based on the broadcast time offset value $t_{offset}$, that is, the time stamp in the ephemeris data may be forwarded by 44 ms to obtain a more accurate uplink timing advance value.

Figure 9:
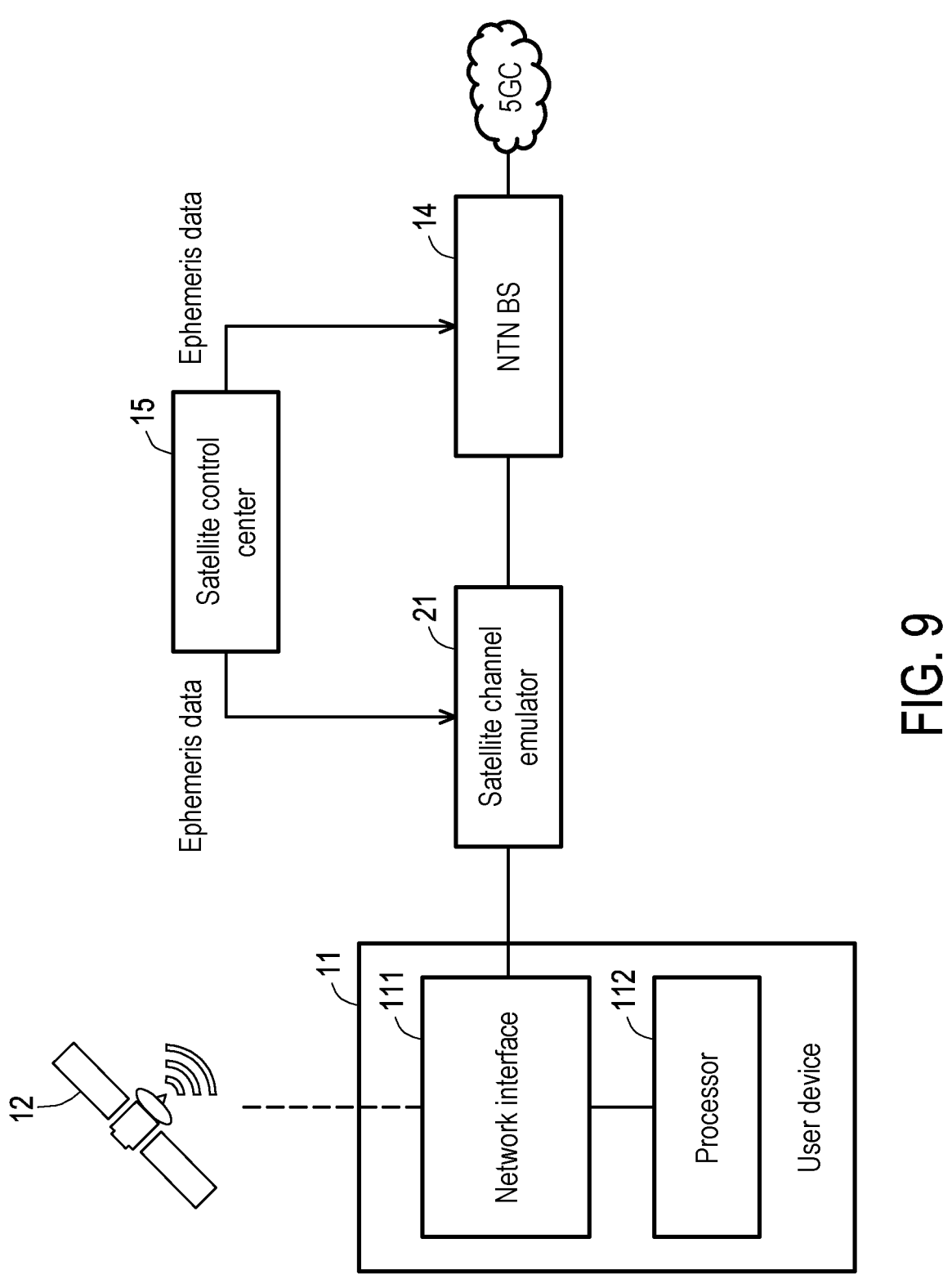
FIG. 9 is an architecture diagram of a user device according to an embodiment of the present disclosure.

FIG. 9 is an architecture diagram of a user device 11 according to an embodiment of the present disclosure. Referring to FIG. 9, the user device 11 includes a network interface 111 and a processor 112. The network interface 111 is a wireless network interface module suitable for non-terrestrial networks. The first downlink signal and the second downlink signal are listened to by connecting the satellite 12 to the non-terrestrial network. In addition, the network interface 111 is also any type of wireless network interface module that supports WiFi standards or other wireless transmission functions and is connected to the satellite channel emulator 21 to receive the broadcast time offset value $t_{offset}$.

The processor 112 is coupled to the network interface 111. The processor 112 is, for example, a central processing unit (CPU), a physics processing unit (PPU), a programmable microprocessor, an embedded control chip, a digital signal processor (DSP), an application specific integrated circuit (ASIC) or other similar devices.

The processor 112 is disposed to perform the following steps: obtaining the first reception time $t_1$ when the network interface 111 receives the first downlink signal, and obtaining the second reception time $t_2$ when the network interface 111 receives the second downlink signal, as shown in FIG. 4. The second reception time $t_2$ minus the first reception time $t_1$ and the known interval time P is the reception time difference variation $t_{delta}$. Then, the first reception time $t_1$, the second reception time $t_2$ and the reception time difference variation $t_{delta}$ are transmitted to the satellite channel emulator 21 through the network interface 111.

After the satellite channel emulator 21 receives the first reception time $t_1$, the second reception time $t_2$ and the reception time difference variation $t_{delta}$, the broadcast time offset value $t_{offset}$ is calculated through steps S304 to S314 in the time offset measurement method 3 as shown in FIG. 3. The relevant details of the satellite channel emulator 21 calculating the broadcast time offset value $t_{offset}$ through steps S304 to S314 in the time offset measurement method 3 shown in FIG. 3 have been explained in the previous paragraphs and will not be described again here.

When the satellite channel emulator 21 calculates the broadcast time offset value $t_{offset}$, and after the user device 11 receives the broadcast time offset value $t_{offset}$ from the satellite channel emulator 21 through the network interface 111, the satellite position is estimated based on ephemeris data and the uplink signal timing advance or retard is determined based on the broadcast time offset value $t_{offset}$ to obtain a more accurate uplink timing advance value.

Figure 10:
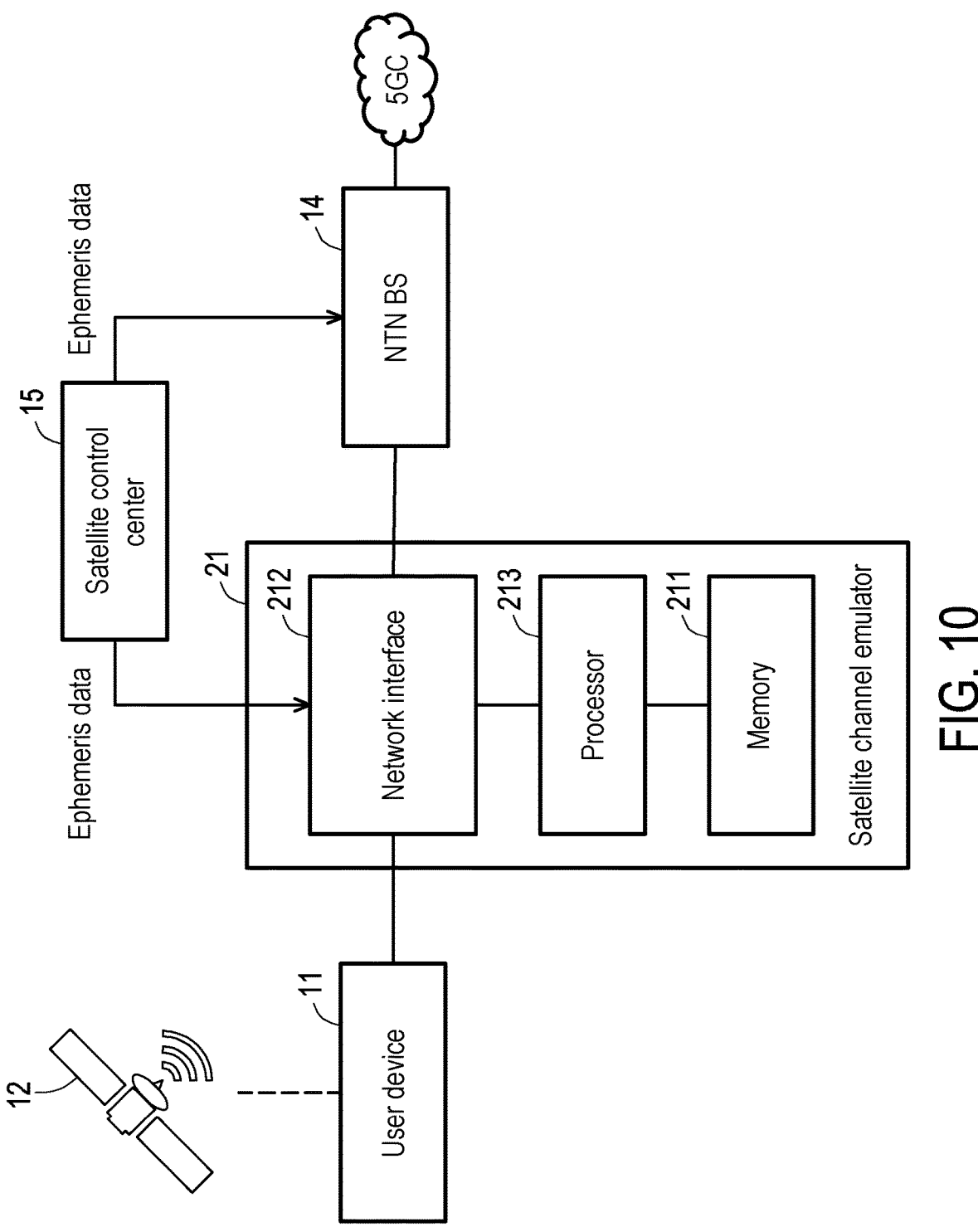
FIG. 10 is an architectural diagram of a satellite channel emulator according to an embodiment of the present disclosure.

FIG. 10 is an architectural diagram of a satellite channel emulator 21 according to an embodiment of the present disclosure. Referring to FIG. 10, the satellite channel emulator 21 includes a memory 211, a network interface 212 and a processor 213. The memory 211 is disposed to store ephemeris data from the satellite control center 15. The memory 211 may be a storage medium such as a random access memory (RAM) or a hard disk drive (HDD), which is not limited by this disclosure.

The network interface 212 is connected to the satellite control center 15 for receiving ephemeris data. The network interface 212 is also connected to the user device 11 for receiving the first reception time $t_1$, the second reception time $t_2$ and the reception time difference variation $t_{delta}$. The user device 11 listens to the first downlink signal to obtain the first reception time $t_1$, which is the time when the first downlink signal is received. The user device 11 listens to the second downlink signal to obtain the second reception time $t_2$, which is the time when the second downlink signal is received. The first downlink signal and the second downlink signal are signals with a known interval time P, and the reception time difference variation $t_{delta}$ is the second reception time $t_2$ minus the first reception time $t_1$ minus the known interval time P. The network interface 212 is further connected to NTN base station (BS) 14. The network interface 212 is, for example, any type of wireless network interface module that supports WiFi standards or has other wireless transmission functions, or any type of wired network interface module that supports Ethernet and optical fiber, or has other wired transmission functions.

The processor 213 is coupled to the memory 211 and the network interface 212. The processor 212 is, for example, a central processing unit (CPU), a physics processing unit (PPU), a programmable microprocessor, an embedded control chip, a digital signal processor (DSP), an application specific integrated circuit (ASIC) or other similar devices.

The processor 213 is disposed to calculate the broadcast time offset value $t_{offset}$ through steps S304 to S314 in the time offset measurement method 3 as shown in FIG. 3. The relevant details about the processor 213 of the satellite channel emulator 21 calculating the broadcast time offset value $t_{offset}$ through steps S304 to S314 in the time offset measurement method 3 as shown in FIG. 3 have been explained in the previous paragraphs and will not be repeated here.

After the processor 213 calculates the broadcast time offset value $t_{offset}$, the satellite channel emulator 21 may compensate and correct some NTN network components based on the broadcast time offset value $t_{offset}$. In an embodiment, the satellite channel emulator 21 may transmit the broadcast time offset value $t_{offset}$ (for example, 44 ms) to the satellite control center 15 and notify the satellite control center 15 to transmit the ephemeris data to the NTN base station (BS) 14 44 ms in advance. In another embodiment, the satellite channel emulator 21 may transmit the broadcast time offset value $t_{offset}$ (for example, 44 ms) to the satellite control center 15, and notify the satellite control center 15 to retard sending the ephemeris data to the satellite channel emulator 21 by 44 ms, or retard generating the corresponding channel effect by 44 ms after the satellite channel emulator 21 receives the ephemeris data. In another embodiment, the satellite channel emulator 21 may transmit the broadcast time offset value $t_{offset}$ (for example, 44 ms) to the NTN base station (BS) 14, and notify the NTN base station (BS) 14 to forward the time stamp in the ephemeris data by 44 ms to generate adjusted ephemeris data. In yet another embodiment, when the user device 11 estimates the satellite position based on the broadcast ephemeris data, an additional time offset $t_{offset}$ (for example, 44 ms) is added to the time stamp.

Figure 11:
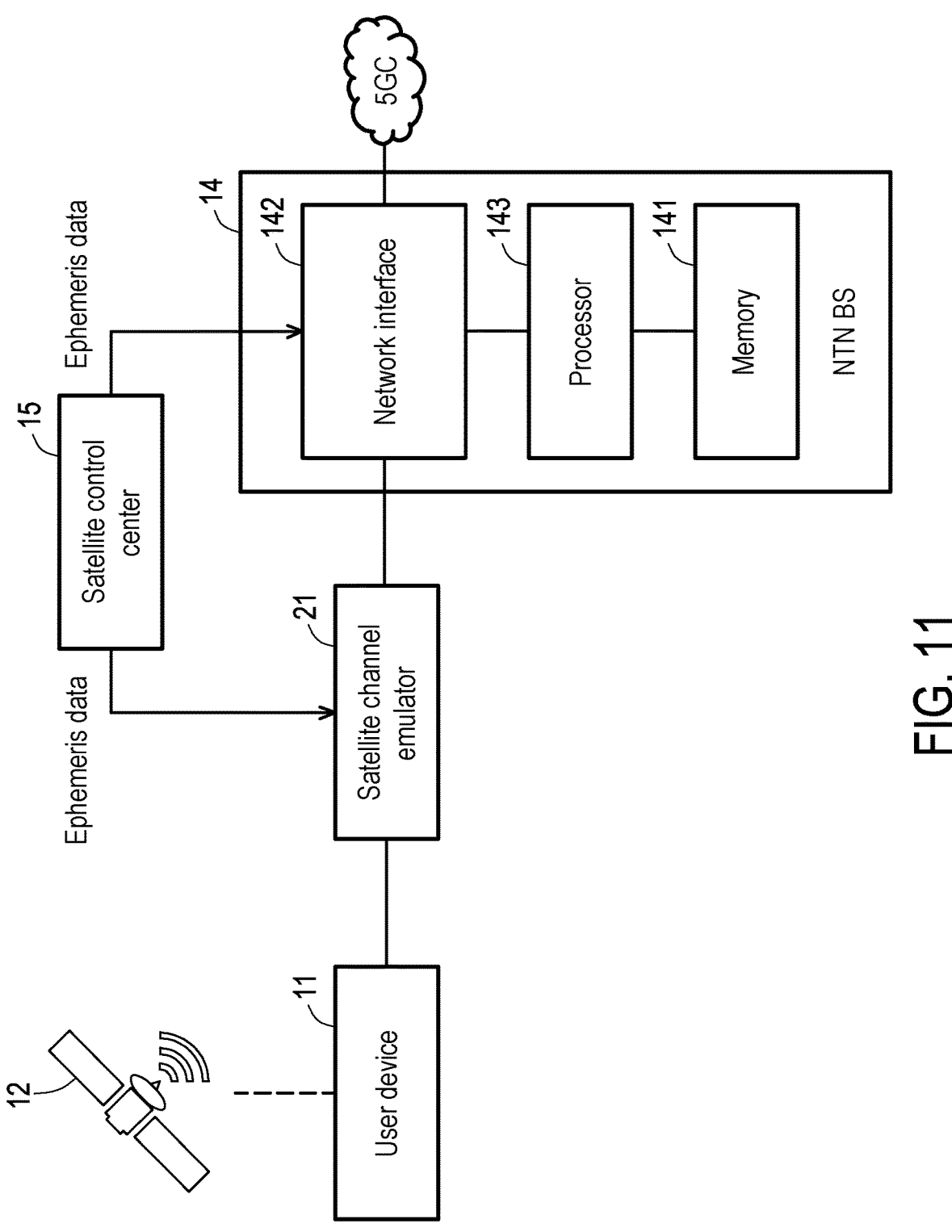
FIG. 11 is an architecture diagram of an NTN next generation node B (gNB) according to an embodiment of the present disclosure.

FIG. 11 is an architecture diagram of an NTN base station (BS) 14 according to an embodiment of the present disclosure. Please refer to FIG. 11, the NTN base station (BS) 14 includes a memory 141, a network interface 142 and a processor 143. The memory 141 is disposed to store ephemeris data from the satellite control center 15. The memory 141 may be a storage medium such as a random access memory (RAM) or a hard disk drive (HDD), which is not limited by this disclosure.

The network interface 142 is connected to the satellite control center 15 for receiving ephemeris data. The network interface 142 is also connected to the satellite channel emulator 21 for receiving the broadcast time offset value $t_{offset}$. The network interface 142 is also connected to the NTN base station (BS) 14. The network interface 142 is, for example, any type of wireless network interface module that supports WiFi standards or has other wireless transmission functions, or any type of wired network interface module that supports Ethernet and optical fiber, or has other wired transmission functions.

The processor 143 is coupled to the memory 141 and the network interface 142 to obtain the ephemeris data and the broadcast time offset value $t_{offset}$, and forward the time stamp in the ephemeris data to the broadcast time offset value $t_{offset}$ to generate the adjusted ephemeris data. The processor 112 is, for example, a central processing unit (CPU), a physics processing unit (PPU), a programmable microprocessor, an embedded control chip, a digital signal processor (DSP), an application specific integrated circuit (ASIC) or other similar devices.

The broadcast time offset value $t_{offset}$ received by the network interface 142 of the NTN base station (BS) 14 through connection to the satellite channel emulator 21 is calculated by the satellite channel emulator 21 through steps S304 to S314 in the time offset measurement method 3 as shown in FIG. 3. The relevant details of the satellite channel emulator 21 calculating the broadcast time offset value $t_{offset}$ through steps S304 to S314 in the time offset measurement method 3 shown in FIG. 3 have been explained in the previous paragraphs and will not be described again here.

To sum up, the broadcast time offset measurement method of ephemeris data, the user device, the satellite channel emulator and the gNB provided by the present disclosure may receive the two reception times of the two downlink signals by listening to the two downlink signals to determine whether the satellite is flying farther away from or closer to the user device, and generate a satellite distance function through the distance between the user device and the satellite, generate the satellite movement function through the satellite distance function, use the satellite distance function and satellite movement function to estimate the difference between the satellite position obtained from the ephemeris data broadcast by the satellite control center and the actual position of the satellite, and calculate the compensated offset value accordingly. The calculated offset value is used to compensate and correct some NTN network components. Therefore, the broadcast time offset measurement method of ephemeris data, the user device, the satellite channel emulator and the gNB provided by the present disclosure may enable the ephemeris data transmitted by the satellite control center to the gNB to overcome the network propagation retard and significantly reduce the frequency offset caused by the Doppler effect, so that the ephemeris estimation result received by the user device is able to be synchronized with the currently experienced satellite channel status.

What is claimed is:

1. A time offset measurement method suitable for a non-terrestrial network (NTN), comprising:

listening to, by a user device, a first downlink signal from a satellite to obtain a first reception time when the first downlink signal is received, listening to a second downlink signal from the satellite to obtain a second reception time when the second downlink signal is received, wherein the first downlink signal and the second downlink signal are signals with a known interval time, wherein the second reception time minus the first reception time and the known interval time is a reception time difference variation;

using the known interval time as a unit time length to calculate a plurality of satellite distance difference values corresponding to a plurality of the unit time lengths through a satellite distance function, obtaining a plurality of satellite movement time variations through dividing the plurality of satellite distance difference values by an electromagnetic wave propagation speed, generating a satellite movement function based on each of a plurality of sampling times and each of the plurality of satellite movement time variations corresponding to each of the plurality of sampling times; wherein the satellite distance function is a function of the plurality of sampling times corresponding to a plurality of receiving distances between the user device and the satellite;

using the reception time difference variation to calculate the corresponding sampling time through the satellite movement function as a downlink signal reception time;

obtaining a current distance between the user device and the satellite at the second reception time according to an ephemeris data, and using the current distance as the receiving distance of the satellite distance function to calculate the corresponding sampling time as an ephemeris broadcast time; and calculating a broadcast time offset value, wherein the broadcast time offset value is the downlink signal reception time plus the known interval time minus the ephemeris broadcast time.

2. The time offset measurement method according to claim 1, further comprising:

determining a total time length during which the user device is able to receive the first downlink signal and the second downlink signal from the satellite;

obtaining a plurality of satellite coordinates of the satellite on a known satellite orbit at the plurality of sampling times within the total time length; and calculating the plurality of receiving distances between the user device and the satellite at the plurality of sampling times according to the plurality of satellite coordinates to generate the satellite distance function.

3. The time offset measurement method according to claim 1, further comprising:

obtaining a plurality of satellite coordinates of the satellite at the plurality of sampling times based on a time stamp and a satellite position data in the ephemeris data; and calculating the plurality of receiving distances between the user device and the satellite at the plurality of sampling times according to the plurality of satellite coordinates to generate the satellite distance function.

4. The time offset measurement method according to claim 1, wherein a satellite control center transmits the ephemeris data to an NTN base station (BS) early or late based on the broadcast time offset value.

5. The time offset measurement method according to claim 1, wherein a satellite control center transmits the ephemeris data to a satellite channel emulator early or late based on the broadcast time offset value.

6. The time offset measurement method according to claim 1, wherein the NTN BS adjusts a value of a time stamp in the ephemeris data in advance or backwards based on the broadcast time offset value to generate an adjusted ephemeris data.

7. The time offset measurement method according to claim 1, wherein the user device advances or delays a value of a time stamp used when estimating a satellite position based on the broadcast time offset value.

8. A user device, comprising:
   a network interface connected to an NTN and a satellite channel emulator for listening to a first downlink signal and a second downlink signal from a satellite and receiving a broadcast time offset value; and
   a processor coupled to the network interface for:
       obtaining a first reception time when the network interface receives the first downlink signal, and obtaining a second reception time when the network interface receives the second downlink signal, wherein the first downlink signal and the second downlink signal are signals with a known interval time, wherein the second reception time minus the first reception time and the known interval time is a reception time difference variation;
       transmitting the first reception time, the second reception time and the reception time difference variation to the satellite channel emulator through the network interface;
       receiving the broadcast time offset value from the satellite channel emulator through the network interface; and
       calculating a satellite position according to an ephemeris data and determining an uplink timing advance or retard time based on the broadcast time offset value.

9. The user device according to claim 8, wherein the satellite channel emulator receives the first reception time and the second reception time, uses the known interval time as a unit time length to calculate a plurality of satellite distance difference values corresponding to a plurality of the unit time lengths through a satellite distance function, obtains a plurality of satellite movement time variations through dividing the plurality of satellite distance difference values by an electromagnetic wave propagation speed, generates a satellite movement function based on each of a plurality of sampling times and each of the plurality of satellite movement time variations corresponding to each of the plurality of sampling times, uses a reception time difference variation to calculate the corresponding sampling time through the satellite movement function as a downlink signal reception time, obtains a current distance between the user device and the satellite at the second reception time according to the ephemeris data received from a satellite control center, uses the current distance as the receiving distance of the satellite distance function to calculate the corresponding sampling time as an ephemeris broadcast time, and calculates the broadcast time offset value;
wherein the satellite distance function is a function of the plurality of sampling times corresponding to a plurality of the receiving distances between the user device and the satellite;

wherein the broadcast time offset value is the downlink signal reception time plus the known interval time minus the ephemeris broadcast time.

10. A satellite channel emulator comprising:
   a memory disposed to store an ephemeris data;
   a network interface connected to a satellite control center, a user device, and an NTN BS, disposed to receive a first reception time, a second reception time and a reception time difference variation from the user device, wherein the user device listens to a first downlink signal from a satellite to obtain the first reception time, which is a time when the first downlink signal is received, the user device listens to a second downlink signal from the satellite to obtain the second reception time, which is a time when the second downlink signal is received, wherein the first downlink signal and the second downlink signal are signals with a known interval time, wherein the reception time difference variation is the second reception time minus the first reception time and the known interval time;
   a processor coupled to the memory and the network interface for:
       using the known interval time as a unit time length to calculate a plurality of satellite distance difference values corresponding to a plurality of the unit time lengths through a satellite distance function, obtaining a plurality of satellite movement time variations through dividing the plurality of satellite distance difference values by an electromagnetic wave propagation speed, generating a satellite movement function based on each of a plurality of sampling times and each of the plurality of satellite movement time variations corresponding to each of the plurality of sampling times; wherein the satellite distance function is a function of the plurality of sampling times corresponding to a plurality of receiving distances between the user device and the satellite;
       using the reception time difference variation to calculate the corresponding sampling time through the satellite movement function as a downlink signal reception time;
       obtaining a current distance between the user device and the satellite at the second reception time according to the ephemeris data, and using the current distance as the receiving distance of the satellite distance function to calculate the corresponding sampling time as an ephemeris broadcast time; and
       calculating the broadcast time offset value, wherein the broadcast time offset value is the downlink signal reception time plus the known interval time minus the ephemeris broadcast time.

11. The satellite channel emulator according to claim 10, wherein the user device determines a total time length during which the user device is able to receive the first downlink signal and the second downlink signal from the satellite, wherein the processor is further disposed to:
   receive the total time length from the user device through the network interface;
   obtain a plurality of satellite coordinates of the satellite on a known satellite orbit at the plurality of sampling times within the total time length; and
   calculate the plurality of receiving distances between the user device and the satellite at the plurality of sampling times according to the plurality of satellite coordinates to generate the satellite distance function.

12. The satellite channel emulator according to claim 10, wherein the processor is further disposed to:

obtain a plurality of satellite coordinates of the satellite at the plurality of sampling times based on a time stamp and a satellite position data in the ephemeris data; and calculate the plurality of receiving distances between the user device and the satellite at the plurality of sampling times according to the plurality of satellite coordinates to generate the satellite distance function.

13. The satellite channel emulator according to claim 10, wherein the processor is further disposed to:

transmit the broadcast time offset value to the satellite control center, and notify the satellite control center to transmit the ephemeris data to the NTN BS early or late based on the broadcast time offset value.

14. The satellite channel emulator according to claim 10, wherein the processor is further disposed to:

transmit the broadcast time offset value to the satellite control center, and notify the satellite control center to transmit the ephemeris data to the network interface early or late based on the broadcast time offset value.

15. The satellite channel emulator according to claim 10, wherein the processor is further disposed to:

transmit the broadcast time offset value to the NTN BS, and notify the NTN BS to adjust a time stamp in the ephemeris data in advance or backwards based on the broadcast time offset value to generate an adjusted ephemeris data.

16. The satellite channel emulator according to claim 10, wherein the processor is further disposed to:

notify the user device to calculate the satellite position according to the ephemeris data and determine an uplink timing advance or retard time based on the broadcast time offset value.

17. A base station (BS) suitable for an NTN, comprising:

a memory disposed to store an ephemeris data;

a network interface connecting a satellite control center and a satellite channel emulator, and disposed to receive the ephemeris data from the satellite control center and a broadcast time offset value from the satellite channel emulator; and a processor coupled to the memory and the network interface to obtain the ephemeris data and the broadcast time offset value, and adjusting a time stamp in the ephemeris data forward or backwards based on the broadcast time offset value to generate an adjusted ephemeris data, wherein a user device listens to a first downlink signal from a satellite to obtain a first reception time, which is a time when the first downlink signal is received, the user device listens to a second downlink signal from the satellite to obtain a second reception time, which is a time when the second downlink signal is received, wherein the first downlink signal and the second downlink signal are signals with a known interval time, wherein the satellite channel emulator uses the known interval time as a unit time length to calculate a plurality of satellite distance difference values corresponding to a plurality of the unit time lengths through a satellite distance function, obtains a plurality of satellite movement time variations through dividing the plurality of satellite distance difference values by an electromagnetic wave propagation speed, and generates a satellite movement function based on each of a plurality of sampling times and each of the plurality of satellite movement time variations corresponding to each of the plurality of sampling times, wherein the satellite distance function is a function of the plurality of sampling times corresponding to a plurality of receiving distances between the user device and the satellite.

18. The NTN BS according to claim 17, wherein the satellite channel emulator receives the first reception time and the second reception time from the user device, wherein the second reception time minus the first reception time and the known interval time is a reception time difference variation, wherein the satellite channel emulator uses a reception time difference variation to calculate the corresponding sampling time through the satellite movement function as a downlink signal reception time, obtains a current distance between the user device and the satellite at the second reception time according to the ephemeris data, uses the current distance as a receiving distance of the satellite distance function to calculate the corresponding sampling time as an ephemeris broadcast time, and calculates the broadcast time offset value;

wherein the broadcast time offset value is the downlink signal reception time plus the known interval time minus the ephemeris broadcast time.

* * * * *